(12) United States Patent
Iwasaki

(10) Patent No.: US 11,483,441 B2
(45) Date of Patent: Oct. 25, 2022

(54) IMAGE FORMING SYSTEM, IMAGE FORMING APPARATUS, AND NON-TRANSITORY COMPUTER READABLE MEDIUM FOR PROCESSING PRINT REQUEST BASED ON POSITION OF USER

(71) Applicant: FUJIFILM BUSINESS INNOVATION CORP., Tokyo (JP)

(72) Inventor: Manabu Iwasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/173,595

(22) Filed: Feb. 11, 2021

(65) Prior Publication Data

US 2022/0021781 A1    Jan. 20, 2022

(30) Foreign Application Priority Data

Jul. 14, 2020   (JP) .............................. JP2020-120574

(51) Int. Cl.
*H04N 1/00*   (2006.01)
*G06F 3/12*   (2006.01)

(52) U.S. Cl.
CPC ....... *H04N 1/00835* (2013.01); *G06F 3/1222* (2013.01); *G06F 3/1238* (2013.01); *H04N 1/00214* (2013.01); *H04N 1/00336* (2013.01)

(58) Field of Classification Search
CPC .............................. G06F 3/1222; G06F 3/1238
See application file for complete search history.

(56) References Cited

U.S. PATENT DOCUMENTS

| 2007/0188791 | A1* | 8/2007 | Utsunomiya ...... H04N 1/00477 358/1.15 |
| 2008/0021933 | A1* | 1/2008 | Ono ...................... G06F 3/1288 |
| 2013/0335758 | A1* | 12/2013 | Torii ................... G06F 16/3322 358/1.9 |
| 2014/0268209 | A1* | 9/2014 | Yokoyama ............ G06F 3/1261 358/1.14 |
| 2016/0295072 | A1* | 10/2016 | Nagasawa .......... H04N 1/00307 |
| 2017/0155793 | A1* | 6/2017 | Masumoto ............ G06F 3/1288 |
| 2017/0230536 | A1* | 8/2017 | Haapanen ............. G06F 3/1292 |

(Continued)

FOREIGN PATENT DOCUMENTS

| JP | 2006-150778 A | 6/2006 |
| JP | 2011-065369 A | 3/2011 |

*Primary Examiner* — Benjamin O Dulaney
(74) *Attorney, Agent, or Firm* — Oliff PLC

(57) ABSTRACT

An image forming system includes a user terminal that includes a terminal-side processor and an image forming apparatus that includes an apparatus-side processor. In response to receiving an instruction to transmit a print request to the image forming apparatus from a user, the terminal-side processor is configured to hold the print request instead of transmitting the print request to the image forming apparatus and is configured to transmit user information indicating the user to the image forming apparatus. The apparatus-side processor is configured to transmit a transmission-request signal to the user terminal in response to detecting, on a basis of the user information, that the user comes near the image forming apparatus. The terminal-side processor is configured to transmit the print request held by the terminal-side processor to the image forming apparatus in response to receiving the transmission-request signal.

12 Claims, 5 Drawing Sheets

(56) References Cited

U.S. PATENT DOCUMENTS

2018/0335985 A1* 11/2018 Kimura ................ G06F 3/1222
2019/0303057 A1* 10/2019 Suzuki ................. G06F 3/1267
2021/0080885 A1*  3/2021 Akazawa ............... H04W 4/80

* cited by examiner

IMAGE FORMING SYSTEM, IMAGE FORMING APPARATUS, AND NON-TRANSITORY COMPUTER READABLE MEDIUM FOR PROCESSING PRINT REQUEST BASED ON POSITION OF USER

CROSS-REFERENCE TO RELATED APPLICATIONS

This application is based on and claims priority under 35 USC 119 from Japanese Patent Application No. 2020-120574 filed Jul. 14, 2020.

BACKGROUND

(i) Technical Field

The present disclosure relates to an image forming system, an image forming apparatus, and a non-transitory computer readable medium.

(ii) Related Art

Japanese Unexamined Patent Application Publication No. 2011-65369 discloses a print system in which a user holding a wireless terminal logs into an image forming apparatus when the distance between the wireless terminal and the image forming apparatus is equal to or smaller than a predetermined login distance and in which the login distance of a user who has input a processing request to the image forming apparatus is set to be larger than that of another user who has not input a processing request to the image forming apparatus.

Japanese Unexamined Patent Application Publication No. 2006-150778 discloses an image processing apparatus that processes a processing request received from a user, and in the case where a user moves away from the image processing apparatus during the period when a processing request from the user is processed, the image processing apparatus outputs a notification to an information processing terminal used by the user when the processing relating to the processing request is completed.

In the related art, there is known an image forming system in which a print request is transmitted to an image forming apparatus from a user terminal used by a user, and then, the user moves to the location of the image forming apparatus and inputs an execution instruction of processing relating to the print request to the image processing apparatus.

In an image forming system of the related art, there has been a problem in that the status of a print request is unknown to a user after the print request has been transmitted toward an image forming apparatus from a user terminal. If there is such a problem, for example, a user may not be able to use the image forming system without any concern. For example, assume that a user who has performed an input operation so as to instruct a user terminal to transmit a print request to an image forming apparatus moves to the location of the image forming apparatus, to which the user supposes that the print request has been transmitted, and that it turns out that the image forming apparatus does not hold the print request. In such a case, there are various possible reasons why the image forming apparatus does not hold the print request, and examples of the possible reasons are as follows: the user has transmitted the print request to another image forming apparatus by mistake, another person has unreasonably input an execution instruction of the print request so as to cause the image forming apparatus to perform processing relating to the print request and then has walked away with a printed material, and the print request has become lost due to, for example, a malfunction of the image formation system. Since it is difficult to determine such possible reasons, some companies prohibit the use of such image forming apparatuses especially in the case where the image forming apparatuses are installed in public places.

SUMMARY

Aspects of non-limiting embodiments of the present disclosure relate to enabling a user to comprehend the status of a print request transmitted from a user terminal to an image processing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming system including a user terminal that includes a terminal-side processor and an image forming apparatus that includes an apparatus-side processor. In response to receiving an instruction to transmit a print request to the image forming apparatus from a user, the terminal-side processor is configured to hold the print request instead of transmitting the print request to the image forming apparatus and is configured to transmit user information indicating the user to the image forming apparatus. The apparatus-side processor is configured to transmit a transmission-request signal to the user terminal in response to detecting, on a basis of the user information, that the user comes near the image forming apparatus. The terminal-side processor is configured to transmit the print request held by the terminal-side processor to the image forming apparatus in response to receiving the transmission-request signal.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
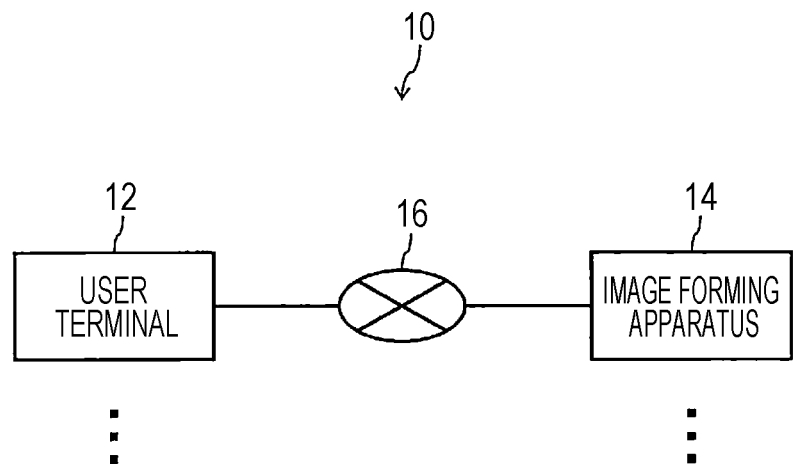
FIG. 1 is a schematic diagram illustrating a configuration of an image forming system according to a first exemplary embodiment.

FIG. 1 is a schematic diagram illustrating a configuration of an image forming system 10 according to a first exemplary embodiment. The image forming system 10 includes a user terminal 12 that serves as one or a plurality of user terminals and at least one image forming apparatus 14. The user terminal 12 and the image forming apparatus 14 are connected to each other so as to be capable of communicating with each other via a communication line 16 such as a LAN. In addition, in the present exemplary embodiment, the user terminal 12 and the image forming apparatus 14 are also capable of communicating with each other by near field communication as will be described later. In the image forming system 10, a print job that is a print request is transmitted to the image forming apparatus 14 from the user terminal 12 in accordance with an instruction from a user. Subsequently, the user moves to the location of the image forming apparatus 14 and operates the image forming apparatus 14 so as to input an execution instruction of the print job, and then the image forming apparatus 14 executes the print job and outputs a print medium on which target data included in the print job is printed.

For example, the image forming system 10 is used in a shared office where a plurality of users belonging to various companies work by sharing an office floor. In such a shared office, there is a case where the image forming apparatus 14 is shared by a plurality of users belonging to various companies while each of the users carries the user terminal 12. In a shared office, a user's anxiety about an unknown status of a print job that which the user has transmitted to the image forming apparatus 14 may become greater because users who belong to the other companies may sometimes use the image forming apparatus 14.

Obviously, the image forming system 10 may be used in various environments other than a shared office.

Figure 2:
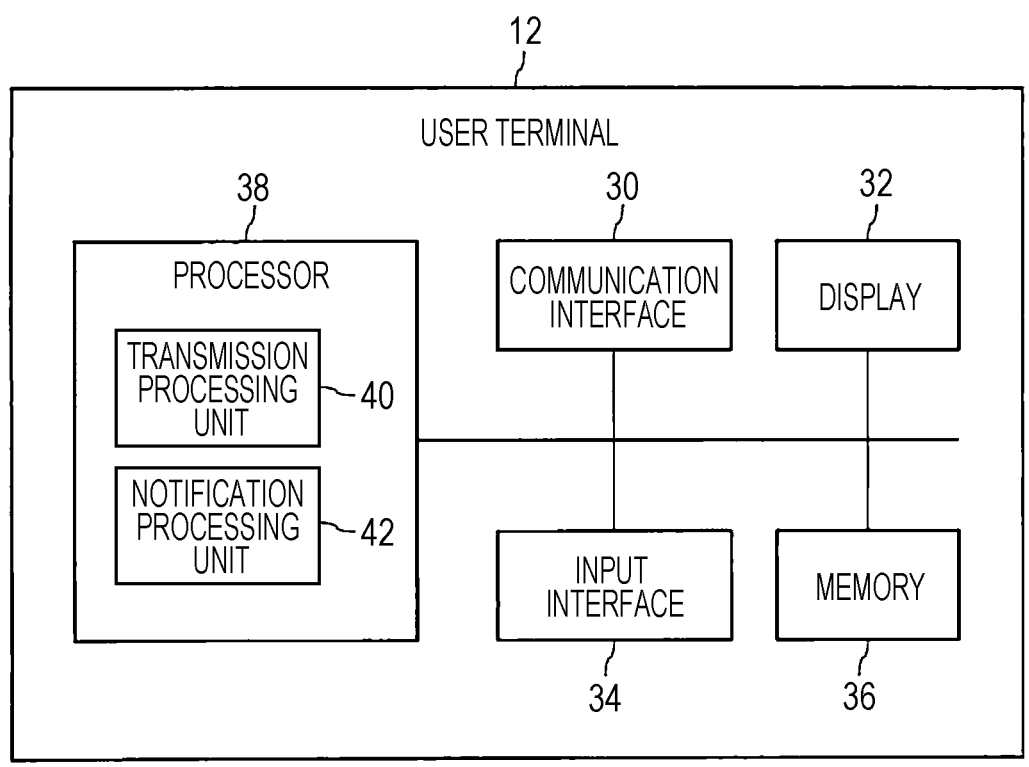
FIG. 2 is a schematic diagram illustrating a configuration of a user terminal according to the first exemplary embodiment.

FIG. 2 is a schematic diagram illustrating a configuration of the user terminal 12. In the present exemplary embodiment, although the user terminal 12 is, for example, a mobile terminal such as a smartphone or a tablet terminal, the user terminal 12 may be any device as long as it exhibits a function that will be described below and may be a non-mobile terminal such as a stationary personal computer. In the case where the image forming system 10 includes a plurality of the user terminals 12, each of the user terminals 12 has a similar structure.

A communication interface 30 includes, for example, a network adapter. The communication interface 30 exhibits a function of communicating with the image forming apparatus 14 via the communication line 16. In the case where the user terminal 12 is a mobile terminal, the communication interface 30 includes a near-field communication adapter and exhibits a function of communicating with the image forming apparatus 14 via near field communication such as Bluetooth (Registered Trademark) low energy (BLE) or Wi-Fi (Registered Trademark).

A display 32 includes, for example, a liquid crystal panel. The display 32 displays various screens. In particular, the display 32 displays a print-job transmission screen for transmission of a print job from the user terminal 12 or screens for various notifications output by a notification processing unit 42, which will be described later.

An input interface 34 includes, for example, a touch panel and a button. The input interface 34 is used by a user for inputting various instructions, particularly a transmission instruction of a print job.

A memory 36 includes, for example, a hard disk drive (HDD), a solid state drive (SSD), read only memory (ROM), or random access memory (RAM). The memory 36 may be provided separately from a processor 38, which will be described later, or at least a portion of the memory 36 may be included in the processor 38. The memory 36 stores a print-request transmitting program for operating each unit of the user terminal 12. In addition, the memory 36 stores a terminal ID that uniquely identifies the user terminal 12.

The processor 38 serving as a terminal-side processor refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. As illustrated in FIG. 2, the processor 38 is caused by programs stored in the memory 36 to exhibit functions of serving as a transmission processing unit 40 and the notification processing unit 42.

The transmission processing unit 40 transmits a print job for causing the image forming apparatus 14 to perform a printing operation to the image forming apparatus 14 via the communication line 16. The print job includes target data that is subjected to the printing operation. In other words, as a result of the image forming apparatus 14 performing the printing operation relating to the print job, the target data included in the print job is printed onto a print medium (e.g., a sheet). The target data is, for example, a document file (e.g., a quotation or a purchase order) or image data.

In addition, the transmission processing unit 40 transmits user information to the image forming apparatus 14 via the communication line 16, the user information indicating a user who has input, to the user terminal 12, an instruction to transmit the print job to the image forming apparatus 14. The user information is information directly indicating the user or information indicating the user terminal 12 used by the user. An example of the information directly indicating the user is a user ID that uniquely identifies the user. The user terminal 12 may obtain the user's user ID through user authentication processing. An example of the information indicating the user terminal 12 is a terminal ID stored in the memory 36.

As will be described in detail later, in the first exemplary embodiment, at the timing of receiving an instruction to transmit a print job from a user, the transmission processing unit 40 holds the print job instead of transmitting the print job to the image forming apparatus 14 and transmits only the user information to the image forming apparatus 14. After that, the transmission processing unit 40 transmits the print job to the image forming apparatus 14 at the timing at which the user comes near the image forming apparatus 14.

In addition, when a condition, which will be described later, is satisfied, the transmission processing unit 40 transmits a terminal ID stored in the memory 36 by near field communication.

The notification processing unit 42 performs processing for outputting various notifications to a user. The notification processing unit 42 may output a notification after the notification processing unit 42 itself has determined a condition for outputting the notification or may output a notification on the basis of a notification instruction from the image forming apparatus 14. Although various notifications are output by being displayed on the display 32 in the present exemplary embodiment, in addition to or instead of this, various notifications may be output as audio from a speaker (not illustrated) that is included in the user terminal 12.

Figure 4:
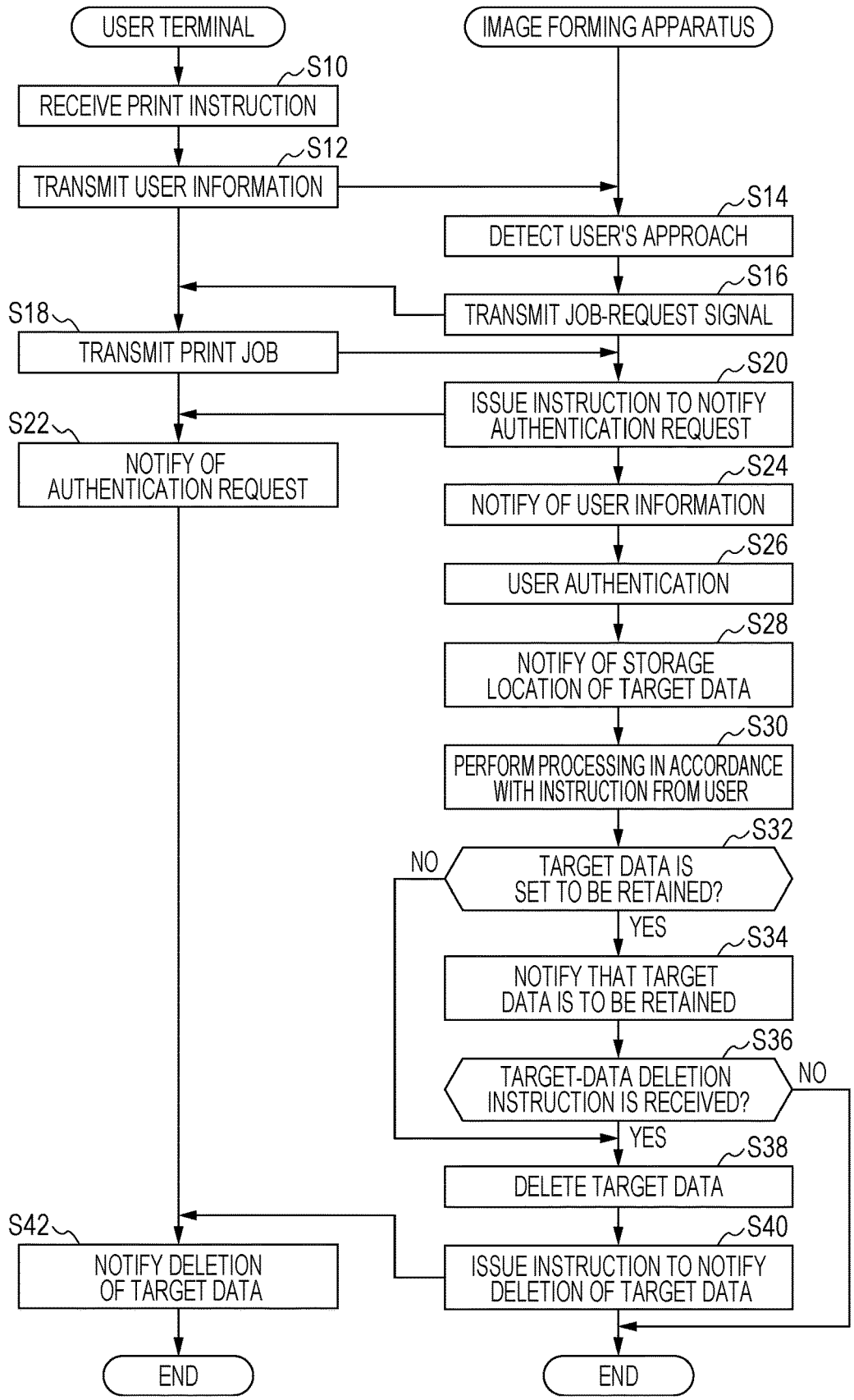
FIG. 4 is a flowchart illustrating a flow of processing that is performed by the image forming system according to the first exemplary embodiment.

Details of processing to be performed by each unit included in the processor 38, the timing at which each unit included in the processor 38 performs the corresponding processing, and so forth will be described later with reference to the flowchart illustrated in FIG. 4.

Figure 3:
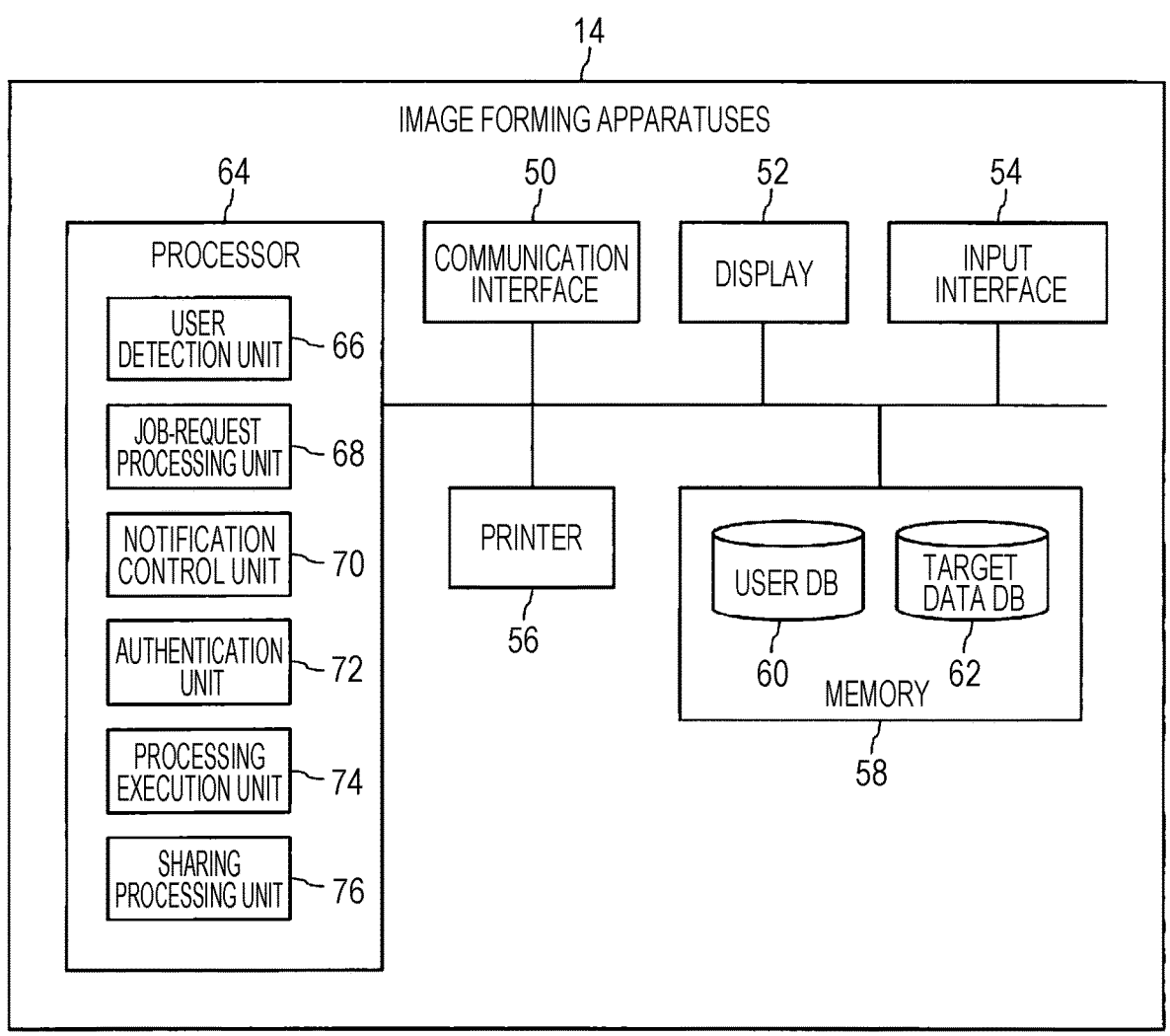
FIG. 3 is a schematic diagram illustrating a configuration of an image forming apparatus according to the first exemplary embodiment.

FIG. 3 is a schematic diagram illustrating the configuration of the image forming apparatus 14. In the present exemplary embodiment, although the image forming apparatus 14 is a multifunction machine having functions such as printing, copying, scanning, facsimile transmission, and saving an electronic document, the image forming apparatus 14 may be any apparatus as long as it exhibits a function that will be described below. In the case where the image forming system 10 includes a plurality of the image forming apparatuses 14, each of the image forming apparatuses 14 has a similar structure.

A communication interface 50 includes, for example, a network adapter. The communication interface 50 exhibits a function of communicating with the user terminal 12 via the communication line 16. In addition, the communication interface 50 includes a near-field communication adapter and exhibits a function of communicating with the user terminal 12 via near field communication such as BLE or Wi-Fi.

A display 52 includes, for example, a liquid crystal panel. The display 52 displays various screens. In particular, the display 52 displays a printing-operation screen relating to processing of a print job that is transmitted from the user terminal 12 or screens for various notifications output by a notification control unit 70, which will be described later.

An input interface 54 includes, for example, a touch panel and a button. The input interface 54 is used by a user for inputting various instructions, particularly an execution instruction of a printing operation relating to a print job.

A printer 56 includes, for example, a sheet feeding mechanism, a photoconductor drum, and a cartridge. The printer 56 is a job processing unit that executes a print job received from the user terminal 12. The printer 56 prints target data that is specified by a print job onto a print medium such as a sheet and outputs the print medium, which has undergone printing.

A memory 58 includes, for example, an HDD, an SSD, ROM, or RAM. The memory 58 may be provided separately from a processor 64, which will be described later, or at least a portion of the memory 58 may be included in the processor 64. The memory 58 stores an image forming program for operating each unit of the image forming apparatus 14. In addition, as illustrated in FIG. 3, the memory 58 stores a user database (DB) 60 and a target data DB 62.

The user DB 60 is a database storing information relating to a user of the image forming apparatus 14. User registration is performed on the image forming apparatus 14 by, for example, an administrator of the image forming apparatus 14 (e.g., an administrator of a shared office), and various information items that are input at the time of the user registration are stored into the user DB 60. In the user DB 60, a user ID, a user name, a terminal ID of the user terminal 12 used by the user, and so forth are stored in association with one another.

The target data DB 62 is a database storing target data that is specified by a print job. When the image forming apparatus 14 receives a print job from the user terminal 12, target data included in the print job is stored into the target data DB 62.

A plurality of storage areas (e.g., folders) are defined in the target data DB 62, and the target data included in the received print job is stored in one of the storage areas that is selected in accordance with a predetermined rule. A user usually transmits a print job to the image forming apparatus 14 and then selects, by operating the image forming apparatus 14, target data corresponding to the transmitted print job from data items stored in the plurality of storage areas. After that, the user inputs an execution instruction of the print job.

In the image forming apparatus 14, target data that relates to a print job and that is stored in the target data DB 62 may be set beforehand to be deleted or to be retained after completion of execution of the print job. In the case where target data is set to be deleted, after completion of execution of a print job, the target data relating to the print job is automatically deleted from the target data DB 62. In the case where target data is set to be retained, after completion of execution of a print job, the target data relating to the print job is retained in the target data DB 62. Even in this case, the target data may be deleted from the target data DB 62 in accordance with an instruction from a user.

The processor 64 serving as an apparatus-side processor refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. As illustrated in FIG. 3, the processor 64 is caused by image forming programs stored in the memory 36 to exhibit functions of serving as a user detection unit 66, a job-request processing unit 68, a notification control unit 70, an authentication unit 72, a processing execution unit 74, and a sharing processing unit 76.

The user detection unit 66 detects that a user who has issued an instruction to transmit a print job to the image forming apparatus 14 comes near the apparatus, that is, the image forming apparatus 14, on the basis of the user information transmitted from the user terminal 12. In the present exemplary embodiment, the user detection unit 66 determines that a user who has input a transmission instruction of a print job to the user terminal 12 comes near the image forming apparatus 14 by the fact that the user terminal 12 that has transmitted the print job comes near the image forming apparatus 14. Note that the wording "a user (or the user terminal 12) comes near the image forming apparatus 14" refers to the case where a user (or the user terminal 12) is located within a predetermined distance from the image forming apparatus 14.

In the present exemplary embodiment, the user detection unit 66 detects that the user terminal 12 comes near the image forming apparatus 14 by near field communication between the user terminal 12 and the image forming apparatus 14. More specifically, first, the transmission processing unit 40 of the user terminal 12 transmits a print job to the image forming apparatus 14 in accordance with a transmission instruction from a user and then starts transmitting the terminal ID stored in the memory 36 by near field communication. The image forming apparatus 14 receives user information (i.e., the user ID of the user or the terminal ID of the user terminal 12) from the user terminal 12 in response to the user inputting a transmission instruction of a print job to the user terminal 12. Then, the user detection unit 66 determines a terminal ID that is associated with the received user ID by referencing to the user DB 60. This determination processing is not necessary in the case where the image forming apparatus 14 receives the terminal ID as the user information from the user terminal 12. Subsequently, the user detection unit 66 determines that the user terminal 12 comes near the image forming apparatus 14 by the fact that the communication interface 50 has received the terminal ID from the user terminal 12 by near field communication. In the case where the signal strength in the near field communication increases as the distance between the user terminal 12 and the image forming apparatus 14 decreases, the user detection unit 66 may determine that the user terminal 12 comes near the image forming apparatus 14 when the communication interface 50 receives the terminal ID from the user terminal 12 with a signal strength that is equal or greater than a predetermined signal strength.

The user detection unit 66 may detect that the user's approach toward the image forming apparatus 14 by a method other than the near field communication between the user terminal 12 and the image forming apparatus 14. In the case where the user carries a global positioning system (GPS) receiver, the user detection unit 66 may detect the user's approach toward the image forming apparatus 14 on that basis of positional information that indicates the location of the GPS receiver and that is transmitted from the GPS receiver via the communication line 16 and positional information that indicates the location of the image forming apparatus 14 and that is known by the user detection unit 66 (that is stored beforehand in the memory 58). This method is effective in the case where the user terminal 12 is a non-mobile terminal.

Alternatively, the user detection unit 66 may detect the user's approach toward the image forming apparatus 14 as a result of the user performing an operation (e.g., an authentication operation) on the image forming apparatus 14. In the case of employing this method, however, the image forming apparatus 14 receives the print job after the user has arrived at the location of the image forming apparatus 14, whereas the print job is transmitted from the user terminal 12 in response to the user detection unit 66 detecting the user's approach toward the image forming apparatus 14 in the first exemplary embodiment as will be described later. Accordingly, during the period when the image forming apparatus 14 receives the print job and performs processing for storing target data included in the print job into the target data DB 62, the user waits for a while.

Note that, in the case where the user detection unit 66 detects that a user (i.e., the user terminal 12) comes near the image forming apparatus 14, the transmission processing unit 40 of the user terminal 12 may stop the transmission of the terminal ID using near field communication.

In response to the user detection unit 66 detecting that a user's approach toward the image forming apparatus 14, the job-request processing unit 68 transmits a job-request signal that is a transmission-request signal for requesting transmission of a print job to the user terminal 12 used by the user. In response to the user terminal 12 receiving the job-request signal, the transmission processing unit 40 of the user terminal 12 transmits the print job, which has been held by the transmission processing unit 40, to the image forming apparatus 14, and the image forming apparatus 14 receives the print job.

The notification control unit 70 performs processing for outputting various notifications to a user. The notification control unit 70 is capable of outputting a notification by causing the display 52 to display the notification, and in addition to or instead of this, the notification control unit 70 may output a notification as audio from a speaker (not illustrated) included in the image forming apparatus 14. In addition, the notification control unit 70 may cause the notification processing unit 42 of the user terminal 12 to output a notification by transmitting a notification-instruction signal to the user terminal 12. In other words, a notification may be output from the user terminal 12 to a user in response to control by the notification control unit 70.

The authentication unit 72 performs an authentication processing for authenticating a user. For example, the image forming apparatus 14 includes a card reader (not illustrated). A user holds a card on which the user's user ID is recorded over the card reader, and the image forming apparatus 14 obtains the user ID as a result of the card reader reading the card. The authentication unit 72 performs the authentication processing by comparing the user ID obtained by the card reader and the information stored in the user DB 60. Obviously, another method (e.g., biometric authentication or manual input of a user ID and a password) may be used for authenticating a user.

The processing execution unit 74 performs processing relating to a print job received from the user terminal 12. More specifically, the processing execution unit 74 controls the printer 56 such that the printer 56 prints target data included in the print job onto a print medium in accordance with an instruction of the print job and outputs the print medium, on which the target data has been printed.

In the case where the image forming system 10 includes a plurality of image forming apparatuses 14 (i.e., the image forming apparatus 14 and another image forming apparatus 14), the sharing processing unit 76 of the image forming apparatus 14 shares information indicating that the image forming apparatus 14 has received the user information from the user terminal 12 with the other image forming apparatus 14. More specifically, the sharing processing unit 76 forwards the user information received from the user terminal 12 to the other image forming apparatus 14. In the case where there are a plurality of image forming apparatuses 14 other than the image forming apparatus 14, the sharing processing unit 76 of the image forming apparatus 14 broadcasts the user information received from the user terminal 12. As a result of receiving the user information from the image forming apparatus 14, the other image forming apparatuses 14 may recognize that the image forming apparatus 14, which is the transmission source of the user information, has received a print job transmitted from the user terminal 12 that has received a transmission instruction of the print job from the user who is indicated by the user information. Note that the image forming apparatus 14 may broadcast an apparatus ID, which uniquely identifies the image forming apparatus 14, together with the user information to the other image forming apparatuses 14. In this case, the apparatus ID is stored beforehand in the memory 58.

Details of processing to be performed by each unit included in the processor 64, the timing at which each unit included in the processor 64 performs the corresponding processing, and so forth will be described below with reference to the flowchart illustrated in FIG. 4.

A processing flow of the image forming system 10 according to the first exemplary embodiment and details of processing that is performed by the user terminal 12 and processing that is performed by the image forming apparatus 14 will be described below with reference to the flowchart illustrated in FIG. 4.

In step S10, the input interface 34 of the user terminal 12 receives, from a user, an instruction to transmit a print job that includes target data specified by the user and designation of the image forming apparatus 14 that is a transmission destination of the print job. After inputting the print-job transmission instruction, the user starts moving toward the designated image forming apparatus 14 in order to input an execution instruction of the print job to the image forming apparatus 14.

In step S12, the transmission processing unit 40 causes the memory 36 to hold the print job relating to the transmission instruction from the user instead of transmitting the print job to the designated image forming apparatus 14 and transmits user information that indicates the user to the image forming apparatus 14. As mentioned above, the user information includes at least one of the user ID and the terminal ID.

After transmitting the user information to the image forming apparatus 14, the transmission processing unit 40 starts transmission of the terminal ID, which is stored in the memory 36, by near field communication.

In step S14, in response to receiving the user information from the user terminal 12, the user detection unit 66 of the image forming apparatus 14 starts processing for detecting that the user who has issued the transmission instruction of the print job comes near the image forming apparatus 14 on the basis of the user information. As described above, in the present exemplary embodiment, in response to the communication interface 50 receiving the terminal ID, which is determined on the basis of the user information received in step S12, from the user terminal 12 by near field communication, the user detection unit 66 detects that the user comes near the image forming apparatus 14. If the user detection unit 66 detects that the user, who has issued the transmission instruction of the print job, comes near the image forming apparatus 14, the process proceeds to step S16.

In step S16, the job-request processing unit 68 transmits a job-request signal to the user terminal 12 for requesting transmission of the print job. Since near field communication between the user terminal 12 and the image forming apparatus 14 may be established in step S14, the job-request processing unit 68 may transmit the job-request signal by near field communication. In particular, for example, in the case where the user terminal 12 is a non-mobile terminal, the job-request processing unit 68 may transmit the job-request signal on the basis of the IP address of the transmission source of the user information received in step S12 (i.e., the IP address of the user terminal 12) via the communication line 16.

In step S18, the transmission processing unit 40 of the user terminal 12 transmits the print job held in step S12 to the image forming apparatus 14 on the basis of the job-request signal received from the image forming apparatus 14. In this case, the transmission processing unit 40 may associate the print job and the user information of the user with each other and transmit the print job and the user information so that it becomes clear that the print job relates to the user whose approach toward the image forming apparatus 14 has been detected in step S14. The image forming apparatus 14 receives the print job transmitted from the user terminal 12 and performs processing for storing the target data, which is included in the print job, into a predetermined storage location (e.g., a folder) in the target data DB 62.

In step S20, the notification control unit 70 of the image forming apparatus 14 notifies the user of an authentication request. At the timing of step S20, there is a possibility that the user has not yet arrived at the location of the image forming apparatus 14, and thus, in the present exemplary embodiment, the notification control unit 70 transmits a notification-instruction signal relating to the authentication request to the user terminal 12. Note that, in the case where the user terminal 12 is a non-mobile terminal, the notification control unit 70 may cause the image forming apparatus 14 to output a notification of the authentication request (e.g., the notification control unit 70 may cause the display 52 to display a notification message).

In step S22, the notification processing unit 42 of the user terminal 12 outputs, in accordance with the notification-instruction signal received in step S20, a notification prompting the user to perform authentication on the image forming apparatus 14. For example, the notification processing unit 42 causes the display 32 to display a message such as "Document is stored in printer specified. Please log into printer.".

In step S24, before the user performs authentication on the image forming apparatus 14, the notification control unit 70 of the image forming apparatus 14 notifies the user of information relating to the user by causing the image forming apparatus 14 to output the information on the basis of the user information received in step S12 or step S18 and the user DB 60. For example, the notification control unit 70 determines the user name of the user on the basis of the user information received in step S12 and the user DB 60 and causes the display 52 to display the determined user name.

In step S26, the user arrives at the location of the image forming apparatus 14 and allows the card reader of the image forming apparatus 14 to read a card on which, for example, the user ID is recorded, and then, the authentication unit 72 performs authentication processing for the user on the basis of the obtained user ID.

In step S28, the notification control unit 70 notifies, regardless of the user's operation, the user of information that indicates the storage location of the target data in the target data DB 62, the target data relating to the print job, which has been received in step S18. For example, the notification control unit 70 causes the display 52 to display a message such as "Check folder 'AAA'". The notification control unit 70 may notify not only the storage location of the target data but also the user of information that indicates the target data stored in the storage location. For example, the notification control unit 70 causes the display 52 to display a message such as "Document of received print job is document 'BBB' in folder 'AAA'. Select document 'BBB'.".

In step S30, the user selects the target data relating to the print job that the user has transmitted and then inputs an execution instruction of the print job by using the input interface 54. The processing execution unit 74 causes the printer 56 to perform a printing operation relating to the print job in accordance with the execution instruction.

In step S32, the notification control unit 70 determines whether the image forming apparatus 14 is set such that the target data relating to the print job is to be retained in the target data DB 62 after completion of the execution of the print job. In the case where the image forming apparatus 14 is set such that the target data is to be retained, the process proceeds to step S34, and in the case where the image forming apparatus 14 is set such that the target data is not to be retained, the process bypasses step S34 and step S36 and proceeds to step S38.

In step S34, the notification control unit 70 notifies the user that the target data relating to the print job is to be retained in the target data DB 62 after completion of the printing operation relating to the print job. For example, the notification control unit 70 causes the display 52 to display a message such as "Document 'BBB' will be retained in printer after completion of printing.". At this timing, there is a possibility that the user has already moved away from the image forming apparatus 14, and thus, the notification control unit 70 may transmit a notification-instruction signal to the user terminal 12 so as to cause the user terminal 12 to output the above notification.

In step S36, the processing execution unit 74 determines whether an instruction to delete the target data has been received from the user. In the case where the deletion instruction has been received, the process proceeds to step S38, and the processing execution unit 74 deletes the target data from the target data DB 62. In the case of not receiving the deletion instruction, the processing execution unit 74 terminates the process without deleting the target data from the target data DB 62.

In step S40, the notification control unit 70 notifies the user that the target data has been deleted from the target data DB 62. In the present exemplary embodiment, the notification control unit 70 transmits a notification-instruction signal that is related to the deletion of the target data to the user terminal 12. Note that the notification control unit 70 may cause the image forming apparatus 14 to output a notification indicating that the target data has been deleted.

In step S42, the notification processing unit 42 of the user terminal 12 outputs a notification indicating that the target data has been deleted to the user in accordance with the notification-instruction signal received in step S40. For example, the notification processing unit 42 causes the display 32 to display a message such as "Document 'BBB' has been safely deleted from printer.".

The processing flow of the image forming system 10 in the first exemplary embodiment has been described above. In the first exemplary embodiment, a print job is not transmitted to the image forming apparatus 14 at the timing at which the user inputs a print-job transmission instruction to the user terminal 12 (step S12), and the print job is transmitted to the image forming apparatus 14 from the user terminal 12 only when the user comes near the image forming apparatus 14 (step S18). In other words, the print job will not be transmitted from the user terminal 12 unless the user comes near the image forming apparatus 14, and the print job is always to be transmitted to the image forming apparatus 14 that is located near the user.

In the first exemplary embodiment, since a print job is transmitted to the image forming apparatus 14 from the user terminal 12 only when a corresponding user comes near the image forming apparatus 14, the length of time over which the print job is held by the image forming apparatus 14 is shorter than that in the case where the print job is transmitted to the image forming apparatus 14 at the timing at which the user inputs a print-job transmission instruction, and thus, security against leakage of a print job is improved. For example, the probability that another person will unreasonably input an execution instruction of a user's print request is reduced.

Before the image forming apparatus 14 authenticates a user, information relating to the user (e.g., a user name) is displayed on the display 52 (step S24).

In addition, a user is notified of information that indicates the storage location of target data relating to a print job in the target data DB 62 regardless of the user's operation (step S28).

Furthermore, in the case where the image forming apparatus 14 is set such that target data relating to a print job is to be retained in the target data DB 62 after completion of execution of the print job, a user is notified of this setting (step S34).

Details of processing that is performed by the sharing processing unit 76 of each of the image forming apparatuses 14 will now be described with reference to FIG. 5 and FIG. 6. Here, assume the case where the image forming system 10 includes a first image forming apparatus 14A and a second image forming apparatus 14B.

Figure 5:
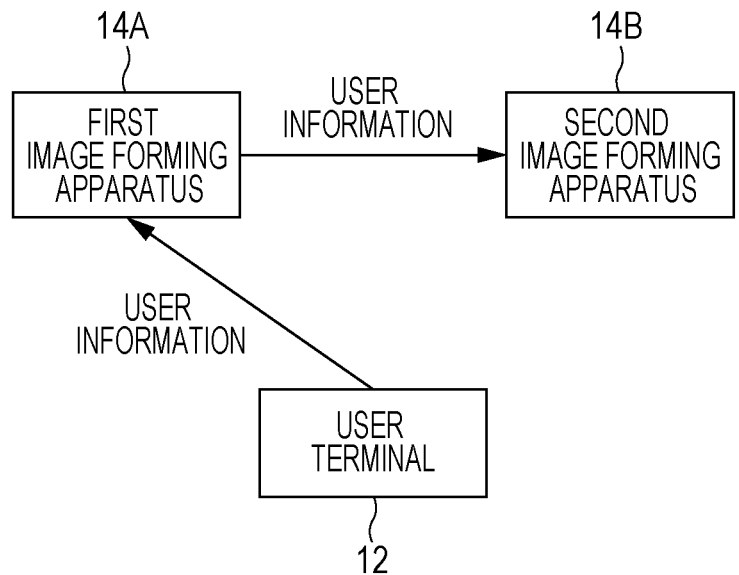
FIG. 5 is a diagram illustrating a state in which the user terminal transmits user information or both the user information and a job to a first image forming apparatus.

First, in response to receiving an instruction to transmit a print job to the first image forming apparatus 14A from a user, the transmission processing unit 40 of the user terminal 12 transmits user information of the user to the first image forming apparatus 14A as illustrated in FIG. 5. Then, as illustrated in FIG. 5, the sharing processing unit 76 of the first image forming apparatus 14A forwards the user information received from the user terminal 12 to the second image forming apparatus 14B. As described above, in the case where the image forming system 10 includes a plurality of image forming apparatuses 14 other than the first image forming apparatus 14A, the sharing processing unit 76 of the first image forming apparatus 14A may broadcast the user information to the other image forming apparatuses 14. As a result, the second image forming apparatus 14B recognizes that the image forming apparatus 14A, which is the transmission source of the user information, has received a print job transmitted from the user terminal 12 that has received a transmission instruction of the print job from the user who is indicated by the user information.

Figure 6:
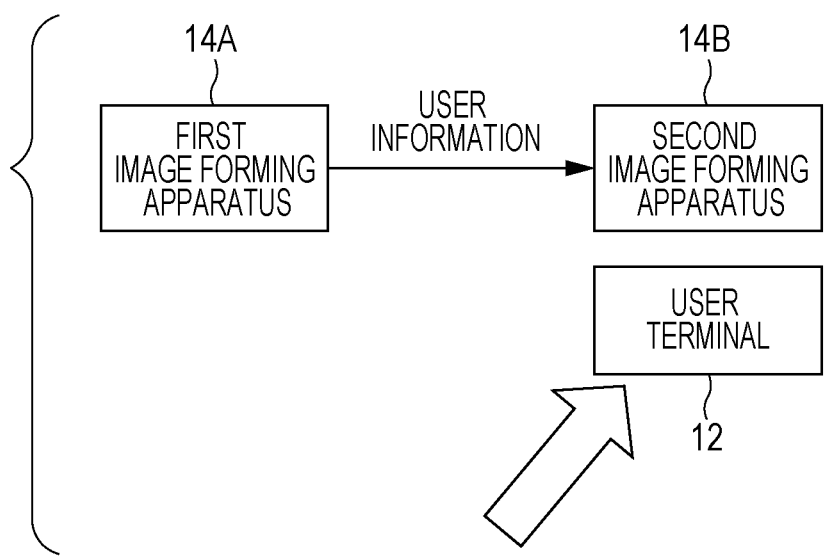
FIG. 6 is a diagram illustrating a state in which the user terminal has come near a second image forming apparatus.

Here, as illustrated in FIG. 6, assume the case where the user accidentally comes near the second image forming apparatus 14B instead of coming near the image forming apparatus 14A that has received the print job transmitted from the user terminal 12, which has received the transmission instruction of the print job. In this case, the user detection unit 66 of the second image forming apparatus 14B detects the user, who has come near the second image forming apparatus 14B, by performing the above-described processing.

In this case, the notification control unit 70 of the second image forming apparatus 14B notifies, on the basis of the user information received from the first image forming apparatus 14A, the user who has come near the second image forming apparatus 14B that the print job transmitted from the user terminal 12, which has received the transmission instruction of the print job from the user, has been received by the first image forming apparatus 14A. More specifically, the notification control unit 70 of the second image forming apparatus 14B causes the display 52 of the second image forming apparatus 14B to display a message such as "Print job has been transmitted to first image forming apparatus.". Alternatively, the notification control unit 70 may transmit a notification-instruction signal to the user terminal 12 so as to cause the user terminal 12 to output a notification.

Second Exemplary Embodiment

The configurations of the image forming system 10, the user terminal 12, and the image forming apparatus 14 according to a second exemplary embodiment are similar to those in the first exemplary embodiment, and thus, descriptions thereof will be omitted. Note that, in the second exemplary embodiment, the processor 64 of each of the image forming apparatuses 14 does not necessarily have a function of serving as the job-request processing unit 68.

Figure 7:
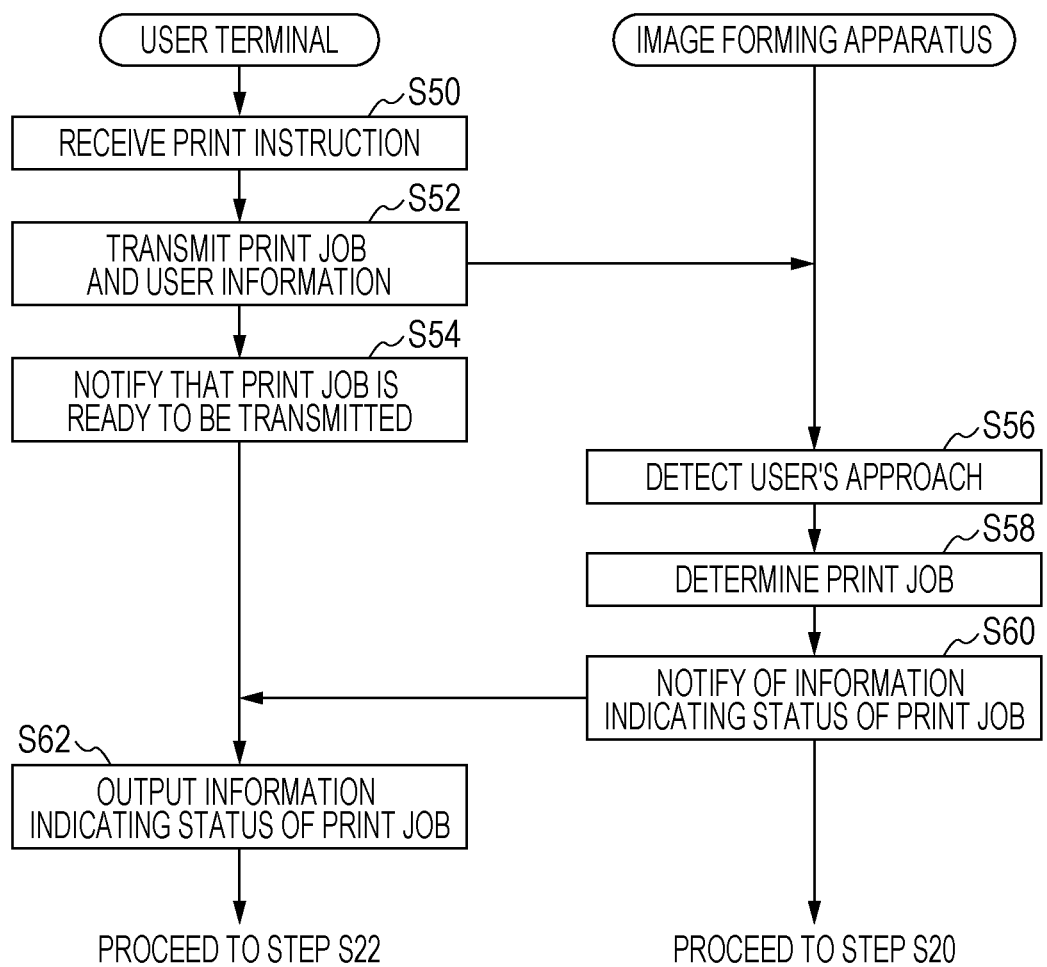
FIG. 7 is a flowchart illustrating a flow of processing that is performed by an image forming system according to a second exemplary embodiment.

In the first exemplary embodiment, at the timing at which the transmission processing unit 40 of the user terminal 12 receives an instruction to transmit a print job from a user, the transmission processing unit 40 does not transmit the print job to the image forming apparatus 14 and transmits user information to the image forming apparatus 14. In contrast, in the second exemplary embodiment, after receiving an instruction to transmit a print job to the image forming apparatus 14 from a user, the transmission processing unit 40 of the user terminal 12 transmits the print job and user information that indicates the user to the image forming apparatus 14. Then, when the user detection unit 66 detects that the user comes near the apparatus (i.e., the image forming apparatus 14), the notification control unit 70 of the image forming apparatus 14 notifies the user of status information that indicates the status of the print job. A processing flow of the image forming system 10 according to the second exemplary embodiment and details of processing that is performed by the user terminal 12 and processing that is performed by the image forming apparatus 14 will be described below with reference to the flowchart illustrated in FIG. 7.

Similar to step S10 of the first exemplary embodiment, in step S50, the input interface 34 of the user terminal 12 receives an instruction to transmit a print job that includes target data specified by a user and designation of the image forming apparatus 14 that is a transmission destination of the print job. After inputting the print-job transmission instruction, the user starts moving toward the designated image forming apparatus 14 in order to input an execution instruction of the print job to the image forming apparatus 14.

In step S52, the transmission processing unit 40 associates the print job relating to the transmission instruction from the user and user information indicating the user with each other and transmits the print job and the user information to the designated image forming apparatus 14. The image forming apparatus 14 causes the memory 58 to hold the received print job and the user information, which is associated with the print job, and stores target data that is included in the print job into one of the storage areas of the target data DB 62.

In step S54, the notification processing unit 42 of the user terminal 12 notifies the user that the print job, which the user has instructed the transmission processing unit 40 to transmit, is "ready to be transmitted". Here, it should be noted that the notification processing unit 42 does not notify the user that the print job "has been transmitted". In other words, although the print job has actually already been transmitted along with the user information to the image forming apparatus 14 in step S52, contrary to the fact, in step S54, the notification processing unit 42 notifies the user that the print job is ready to be transmitted. In particular, at the timing of step S54, the notification processing unit 42 issues a notification indicating that the user terminal 12 still retains the print job. For example, the notification processing unit 42 causes the display 32 to display a message such as "Document is ready to be transmitted to your printer".

Similar to step S14 of the first exemplary embodiment, in step S56, the user detection unit 66 of the image forming apparatus 14 starts processing for detecting that the user, who has issued the transmission instruction of the print job, comes near the image forming apparatus 14 on the basis of the user information received from the user terminal 12. If the user detection unit 66 detects that the user, who has issued the transmission instruction of the print job, comes near the image forming apparatus 14, the process continues to step S58.

In step S58, the processing execution unit 74 determines a user ID or the like of the user, who has been detected in step S56, by referencing to the user DB 60, and the processing execution unit 74 identifies the print job relating to the user detected in step S56 among one or a plurality of print jobs that are retained in the memory 58.

In step S60, the notification control unit 70 notifies the user of status information indicating the status of the print job identified in step S58, that is, the print job relating to the transmission instruction issued by the user whose approach toward the image forming apparatus 14 has been detected. For example, a status of a print job indicates the location of the print job or executability of the print job. In the present exemplary embodiment, the notification control unit 70 transmits a notification-instruction signal that relates to the status information to the user terminal 12 so as to cause the user terminal 12 to output the notification, that is, the status information indicating the status of the print job, in step S62. For example, the notification control unit 70 causes the notification processing unit 42 of the user terminal 12 to display, on the display 32, a message such as "Print job has been received by printer." so as to indicate the location (i.e., in the image forming apparatus 14) of the print job.

If it is detected that the print job is not executable due to, for example, a malfunction of the image forming system 10 even though the image forming apparatus 14 has received the print job and the user information in step S52, the notification control unit 70 may issue a notification indicating that the print job is in a non-printable state. For example, the notification control unit 70 causes the display 32 to display a message such as "Print job is not executable due to problem.". In addition, after the image forming apparatus 14 has received the print job and the user information in step S52, if execution of the print job is instructed by a third party (i.e., a user who is not the user indicated by the user information transmitted in step S52) before the user's approach is detected in step S56, the notification control unit 70 may issue a notification indicating that the print job has been executed. For example, the notification control unit 70 causes the display 32 to display a message such as "Print job you sent has already been executed.".

The status of a print job that is notified to a user by the notification control unit 70 may be different from the actual status of the job as long as it does no harm to the user. For example, in response to a notification indicating that a print job is ready to be transmitted being issued in step S54 (even though the print job has already been transmitted), the notification control unit 70 may issue a notification indicating that the print job is being transmitted to the image forming apparatus 14 from the user terminal 12. For example, the notification control unit 70 causes the display 32 to display a message such as "Document is being transmitted to printer".

Note that the notification control unit 70 may cause the image forming apparatuses 14 to output these notifications, particularly when, for example, the user terminal 12 is a non-mobile terminal.

Processing operations that are subsequently performed by the user terminal 12 are similar to step S22 and the subsequent steps in the first exemplary embodiment, and processing operations that are subsequently performed by the image forming apparatus 14 are similar to step S20 and the subsequent steps in the first exemplary embodiment.

As described above, in the second exemplary embodiment, after a print job has been transmitted from the user terminal 12 in accordance with a transmission instruction from a user, in response to the user detection unit 66 of the image forming apparatus 14 detecting the user's approach toward the image forming apparatus 14 (step S56), the notification control unit 70 of the image forming apparatus 14 notifies the user of the status information indicating the status of the print job. In particular, in the second exemplary embodiment, detection of a user's approach toward the image forming apparatus 14 and processing for issuing a notification to the user are performed through the processing performed by the image forming apparatus 14.

In addition, in the second exemplary embodiment, after a print job has been transmitted from the user terminal 12 in accordance with a transmission instruction from a user, the notification processing unit 42 of the user terminal 12 notifies the user that the print job is ready to be transmitted (step S54), and accordingly, the user may be notified that the print job is being transmitted to the image forming apparatus 14 from the user terminal 12 when the user comes near the image forming apparatus 14 (steps S60 and S62). As a result, the user recognizes as if the print job is transmitted to the image forming apparatus 14 from the user terminal 12 only when the user comes near the image forming apparatus 14 instead of being immediately transmitted to the image forming apparatus 14 in accordance with the print-job transmission instruction.

Although the exemplary embodiments of the present disclosure have been described above, the present disclosure is not limited to the above-described exemplary embodiments, and various changes may be made within the scope of the present disclosure.

For example, in the first and second exemplary embodiments, although the user DB 60 is stored in the memory 58 of the image forming apparatus 14, it may be stored in another apparatus (a server or the like) that is capable of communicating with the image forming apparatus 14.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming system comprising:
a user terminal that includes a terminal-side processor; and
an image forming apparatus that includes an apparatus-side processor, wherein,
in response to receiving an instruction to transmit a print request to the image forming apparatus from a user, the terminal-side processor is configured to hold the print request instead of transmitting the print request to the image forming apparatus and is configured to transmit user information indicating the user to the image forming apparatus,
the apparatus-side processor is configured to transmit a transmission-request signal to the user terminal in response to detecting, on a basis of the user information, that the user comes near the image forming apparatus,
the terminal-side processor is configured to transmit the print request held by the terminal-side processor to the image forming apparatus in response to receiving the transmission-request signal,
the apparatus-side processor is configured to transmit an authentication request signal to the user terminal in response to receiving the print request, and
the terminal-side processor is configured to output an authentication request notification to the user, the authentication request notification prompting the user to perform authentication on the image forming apparatus.

2. The image forming system according to claim 1, wherein, after detecting that the user comes near the image forming apparatus, the apparatus-side processor is configured to cause, before the authentication request signal is transmitted to the user terminal, the image forming apparatus to output information relating to the user.

3. The image forming system according to claim 2, wherein the apparatus-side processor is configured to cause, regardless of an operation performed by the user, the image forming apparatus to output information that indicates an area in which target data relating to the received print request is stored.

4. The image forming system according to claim 3, wherein, when the image forming apparatus is set to retain target data relating to a processed print request instead of deleting the target data, the apparatus-side processor is configured to notify the user that target data relating to the print request is to be retained after completion of a printing operation relating to the print request.

5. The image forming system according to claim 2, wherein, when the image forming apparatus is set to retain target data relating to a processed print request instead of deleting the target data, the apparatus-side processor is configured to notify the user that target data relating to the print request is to be retained after completion of a printing operation relating to the print request.

6. The image forming system according to claim 1, wherein the apparatus-side processor is configured to cause, regardless of an operation performed by the user, the image forming apparatus to output information that indicates an area in which target data relating to the received print request is stored.

7. The image forming system according to claim 6, wherein, when the image forming apparatus is set to retain target data relating to a processed print request instead of deleting the target data, the apparatus-side processor is configured to notify the user that target data relating to the print request is to be retained after completion of a printing operation relating to the print request.

8. The image forming system according to claim 1, wherein, when the image forming apparatus is set to retain target data relating to a processed print request instead of deleting the target data, the apparatus-side processor is configured to notify the user that target data relating to the print request is to be retained after completion of a printing operation relating to the print request.

9. The image forming system according to claim 1, wherein
the image forming apparatus includes a first image forming apparatus; and a second image forming apparatus, the terminal-side processor is configured to transmit the user information to the first image forming apparatus in response to receiving an instruction to transmit a print request to the first image forming apparatus from the user, an apparatus-side processor of the first image forming apparatus is configured to forward the user information received from the user terminal to the second image forming apparatus, and an apparatus-side processor of the second image forming apparatus is configured to notify the user that the print request is transmitted to the first image forming apparatus in response to detecting, on the basis of the user information, that the user comes near the second image forming apparatus.

10. An image forming apparatus comprising:

an apparatus-side processor configured to receive a print request and user information from a user terminal, the user information indicating a user who has issued a transmission instruction of the print request and notify the user of status information indicating a status of the print request in response to the apparatus-side processor detecting, on a basis of the user information, that the user comes near the image forming apparatus;

transmit an authentication request signal to the user terminal in response to receiving the print request; and cause the user terminal to output an authentication request notification to the user, the authentication request notification prompting the user to perform authentication on the image forming apparatus.

11. The image forming apparatus according to claim 10, wherein the status of the print request indicated by the status information is different from an actual status of the print request.

12. A non-transitory computer readable medium storing a program causing a computer to execute a process for forming an image, the process comprising:

receiving user information indicating a user from a user terminal that has received, from the user, an instruction to transmit a print request to the computer;

transmitting a transmission-request signal to the user terminal in response to detecting, on a basis of the user information, that the user comes near the computer;

receiving the print request held by the user terminal from the user terminal in accordance with the transmission-request signal;

transmitting an authentication request signal to the user terminal in response to receiving the print request; and causing the user terminal to output an authentication request notification to the user, the authentication request notification prompting the user to perform authentication on the image forming apparatus.

* * * * *